United States Patent [19]

Link

[11] 3,922,936

[45] Dec. 2, 1975

[54] DRIVING A SINGLE SPINDLE LATHE

[75] Inventor: Helmut Link, Schanbach, Germany

[73] Assignee: Index-Werke KG Kahn & Tessky, Esslingen, Germany

[22] Filed: Apr. 8, 1974

[21] Appl. No.: 458,587

[30] Foreign Application Priority Data

Apr. 27, 1973 Germany............................ 2321542

[52] U.S. Cl. ................................................. 82/28
[51] Int. Cl.² ........................................ B23B 19/02
[58] Field of Search .......... 82/29 A, 29 B, 29 R, 28, 82/3, 2

[56] References Cited

UNITED STATES PATENTS

| 1,130,054 | 3/1915 | Barnum | 82/29 R X |
| 2,058,940 | 10/1936 | Arms et al. | 82/28 R X |
| 2,271,598 | 2/1942 | Maurer | 82/29 R |
| 2,347,259 | 4/1944 | Groene | 82/28 R |
| 2,359,255 | 9/1944 | Smith | 82/28 R X |
| 2,489,725 | 11/1949 | Rutemiller | 82/29 R X |
| 3,292,466 | 10/1966 | Jacoby | 82/29 R |

FOREIGN PATENTS OR APPLICATIONS 1,477,880  9/1969   Germany .................................. 82/3

*Primary Examiner*—Harrison L. Hinson

[57] ABSTRACT

An automatic single spindle lathe in which the spindle is connected to a drive shaft. The drive shaft is driven by a planetary gear transmission system powered simultaneously by two motors. At least one of the motors has a variable speed and at least one of the motors (not necessarily the same) is reversible. The speed of the drive shaft can be selectively varied by superimposition of the two motors in the same or reversed directions at the variable speeds.

9 Claims, 3 Drawing Figures

U.S. Patent   Dec. 2, 1975   3,922,936
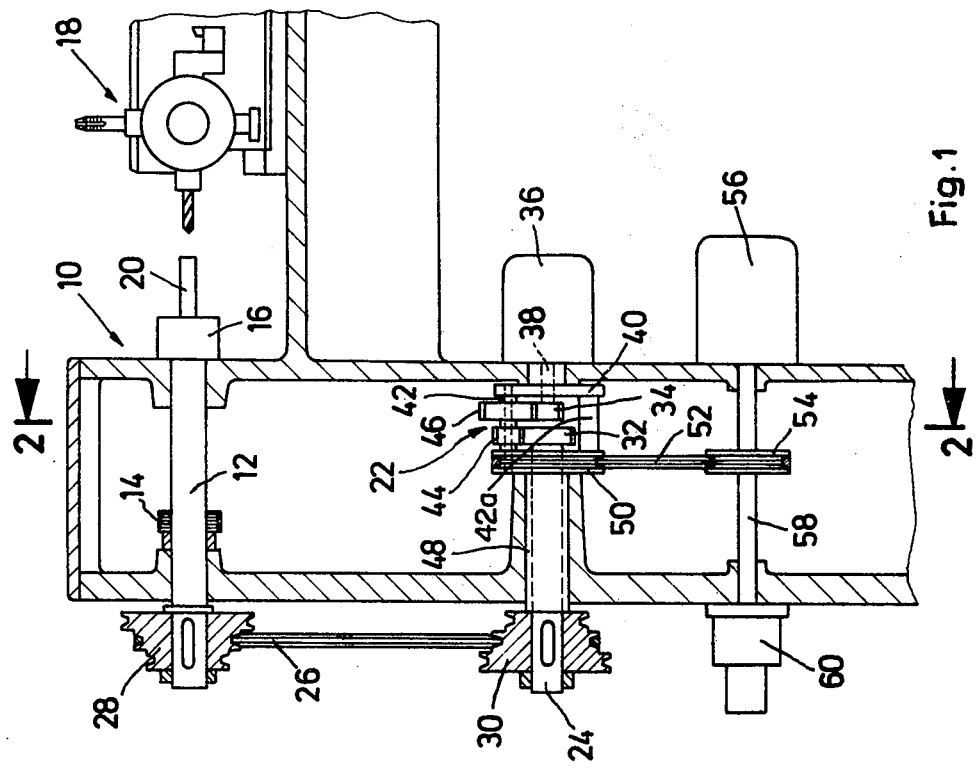
Fig.1
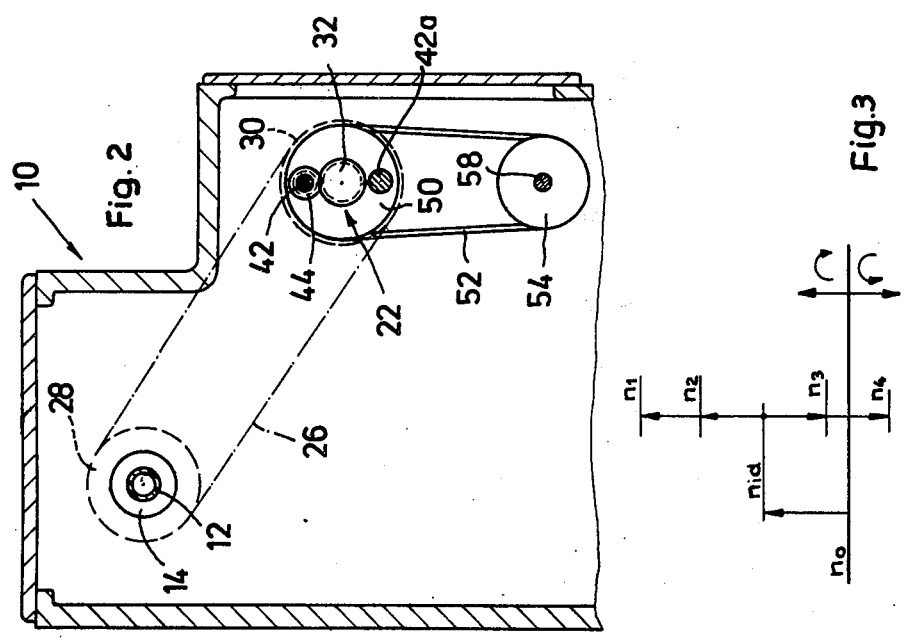
Fig.2
Fig.3

DRIVING A SINGLE SPINDLE LATHE

BACKGROUND OF THE INVENTION

The present invention relates to an automatic single spindle lathe and in particular to means for rotating the spindle at different speeds and in different rotary directions.

The present invention concerns the drive system for the main spindle of such machine tools as are employed for turning, grinding and drilling various workpieces. In general the workpiece is held in a chuck or fixture mounted at the end of the spindle and the spindle is driven at predetermined speeds in a selected direction about its longitudinal axis relative to a cutting or drilling tool. The drive systems for spindles of such automatic lathes are designed so that the largest diameter workpiece may be rotated at the slowest speed while the smallest diameter workpiece may be rotated at the highest speed. Furthermore, in order to enable the cutting of gear threads the drive system must supply a slow speed in the forward direction for conventional threads and a slow to medium speed in the reverse direction for forming oppositely directed threads. On the other hand when hard metal tools are used for turning workpieces it is necessary to supply a substantially higher speed of rotation than that supplied for thread cutting and the drive system must thus be designed so that a spindle speed can be obtained which is adjusted between a ratio of 10:1 to 20:1.

Different principles of design are known and have been employed for the drive systems of the spindle of automatic single spindle lathes. In one construction a built-in reversible transmission is coordinated with a clutch mechanism employing three or four separate clutches. This construction provides great technical advantage and accuracy, but is costly, complex and therefore neither economical to build or operate. In another construction, a coupling means having two clutches, one for rapid and one for slow operation, is provided and is driven by a variable speed motor which is also reversible during thread cutting operation. This design is also costly and complex. In still another example, the main spindle drive transmission is provided by a triply variable motor having a low speed ratio of 1:4. In this latter system the necessary high speed ratios necessary for turning operation, are not readily available.

It is the object of the present invention to provide a main drive system for an automatic spindle lathe which overcomes the disadvantages and defects of the known constructions and which provides a system which is simple and economical both to build and to operate.

It is another object of the present invention to provide a drive system for automatic spindle lathe which can provide optimum speed conditions for different machining operations.

It is an object of the present invention to provide a drive system for an automatic spindle lathe in which variable speeds are obtainable both in the forward and reversed directions.

The foregoing objects, other objects and numerous advantages are more fully set forth and will be described in connection with the following description of the present invention.

THE PRESENT INVENTION

According to the present invention an automatic spindle lathe is provided with a main spindle drive arrangement comprising a drive shaft connected to the spindle which is driven by a planetary gear system powered simultaneously by two motors. At least one of the motors has a variable or adjustable speed and at least one of the motors (not necessarily the same) is reversible. Preferably the two motors are electric and comprise a primary drive motor and an auxiliary drive motor. At least the auxiliary drive motor in the preferred form is variable in speed and direction.

In the accordance with the construction of the present invention, the output speed of the drive shaft may be variable within wide limits by the superimposition on the planetary gear transmission system of the speed of the two motors, which motors are themselves variable relative to one another. The motor which is variable in speed may be adjusted and changeable in predetermined stages or steps or it may be adjustable continuously or stepless over a wide range. The ability of reversing at least one of the motors and thus substracting their relative speeds, permits the direction of rotation of the spindle to be changed as well as permitting a reduction in speed of the spindle. This allows the cutting of oppositely directed gear threads. A further advantage, resides in the fact that the arrangement of the present invention allows the use of motors having relatively low power, since it is possible to achieve high speeds and power such as would be necessary to enable "chipping" operation, by merely adding together the speeds of rotation of the two driving motors.

The planetary gear transmission may take various constructional forms. In the preferred construction however, the planetary gear comprises an epicyclic design having a pair of coaxial shafts on each of which is mounted a sun gear. One of the shafts forms the output of the transmission and the drive shaft of the spindle. The other shaft forms the input of the transmission and the output of one of the motors. A bridge carrying a pair of conjointly revolving planet gears meshes with the sun gears and is driven by the other motor. Such a transmission has the advantage that it dispenses with the use of clutches and enables the creation of optium speed ranges at low cost and simple technological construction.

It is an advantage in this preferred construction to arrange the auxiliary driving motor, having variable speed and direction, as the input drive for the input shaft of the transmission, and coaxial with the output drive shaft for the spindle.

The two motors can of course be designed so that their speeds can both be selectively varied whereby with a suitable selection of speed ratios, obtainable by both motors, a fine graduation of output speeds on the spindle can be attained. However, it is sufficient and most often advantageous, to produce the necessary number of speeds required to drive the spindle, for all turning, grinding and similar operations, by providing that only one motor be variable in speed and reversible in direction. These substantial results are obtained with the use of the planetary gear system, when the bridge of the system is driven by the other drive motor which is nonvariable in speed. By driving one of the motors at a constant speed, a further advantage is obtained, as the constant speed motor may be used to simultaneously drive an additional portion or mechanism of the machine tool, such as a hydraulic pump or refrigerant system for the cooling media. In a specifically preferred arrangement the output shaft (input shaft of the transmission system) of the auxiliary motor (the variable speed and reversible motor) is arranged coaxially with the drive shaft (the output shaft of the transmission). In this arrangement if the auxiliary motor or its shaft is permitted to "free wheel" or run freely, even when disconnected from its electrical power source, the planet gears driven by the constant speed primary motor merely revolve continuously about the sun gear. Thus no driving torque or force is created which can be passed to the output shaft and the spindle remains stationary. This means that if the auxiliary drive motor is thereafter provided with two predetermined speed levels in both its forward (clockwise) and reverse (counterclockwise) directions the output shaft of the transmission system can then be driven at four resultant speeds merely by superimposition (addition and substraction) of the output of the two motors. If now, the auxiliary motor which is variable in speed and reversible in direction is also capable of being braked, the output shaft can be driven at still another speed produced solely by the constantly rotating primary motor alone. As opposed to the free wheeling operation, the braking of the auxiliary motor or its running under operational conditions creates a relative torque between the sun gears and the planetary gears, transmitting to the planetary gears a torque which is passed to the output shaft and in turn to the spindle. By suitably defining the speed ratios of the two motors relative to each other predefined operational speeds of the spindle in both its rotational directions can be obtained.

In many instances the main spindle of an automatic lathe is provided with a brake mechanism to insure its independent stoppage during operating cycles. If such a brake is employed, means must also be provided for simultaneously disconnecting the auxiliary drive motor from its power source to enable it to free wheel or idle thus interrupting the drive of the spindle by thus shifting the epicyclic transmission into an idle condition even though the constant speed primary motor continues to work.

The drive shaft or output shaft of the transmission system is connected to the main spindle of the automatic lathe by a V-belt drive. Each of the drive shaft and spindle are provided with a conical pulley having a plurality of stepped diameters arranged in reciprocable relationship to each other. In this manner the speed of rotation of the spindle may be further modified by interchanging the belt on the pulleys.

In the accompanying drawings and in the following description a preferred construction is illustrated and described as being exemplary of the present invention. It should be understood that the illustrated and described construction is not limiting of the present invention.

BRIEF DESCRIPTION OF THE DRAWINGS

In the drawings:

FIG. 1 is a longitudinal sectional view through a portion of an automatic single spinning lathe showing the headstock, tool capstan and the drive system of the present invention, FIG. 2 is a sectional view taken along lines 2—2 of FIG. 1, and FIG. 3 is a diagramatic representation of the speed and direction of rotation which can be obtained by the spindle in accordance with the present invention.

DESCRIPTION OF THE PREFERRED EMBODIMENT

In FIGS. 1 and 2 there is seen journaled in the headstock portion, generally depicted by the numeral 10, of a single spindle lathe, having a main spindle 12. The spindle 12 is provided with an annular band brake 14 and a fixture such as a chuck 16 for holding a workpiece 20 in a position opposed to a rotatably indexing capstan or tool holder 18. Mounted within the bed frame or frame of the headstock 10, in association with a spindle 12 is a planetary gear transmission system generally depicted by the numeral 22. The planetary gear transmission system comprises a plurality of epicyclic gears having an output drive shaft 24 arranged parallel to the spindle 12. A V-belt 26 is entrained over a conical pulley 28 secured to the spindle 12 and a similar conical pulley 30 secured to the drive shaft 24. The conical pulleys 28 and 30 are provided with stepped diameters to provide a plurality of distinct speed ratios (three are shown). The pulleys are arranged oppositely to each other on their respective spindle and shafts so as to be reciprocal. Thus by interchanging the position of the V-belt 26 on the steps of the pulleys 28 and 30 the speed of the spindle 12 may be varied. The pulleys 28 and 30 may be removably secured to the spindle and shaft respectively so as to be capable of being interchanged with others to thereby even further provide for variances in speed control.

The planetary gear transmission 22 comprises a first central or sun gear 32 coaxially fixed on the output drive shaft 24 and a second central or sun gear 34 which is formed as the output pinion gear of a first drive motor 36. The sun gear 34 is secured to the end of the output shaft 38 of the motor 36. The output shaft 38 of the first drive motor 36 is arranged coaxially with the drive shaft 24 and is suitably journaled in the frame. The planetary gearing system includes a bridge 40, rotatable about the shaft 38, provided with a bearing journal axle 42 on which is mounted a pair of jointly rotatable planet gears 44 and 46 engaging respectively with the sun gears 32 and 34 and a second diametrically opposed bar 42a. Both the axial 42 and the bar 42a are journalled in the pulley 50 coaxially mounted in the drive shaft 24, as seen in FIG. 2.

The drive shaft 24 is journaled in a bushing 48 secured in a web-like boss connecting the sides of the bed frame. Mounted about the bushing 48 is a V-belt pulley 50 about which a belt 52 is entrained. The V-belt 52 is entrained also about a second pulley 54 mounted to the output shaft 58 of a second drive motor 56. The shaft 58 is journaled as well in the frame extending outwardly of the frame opposite to the motor 56. The motor 56 may thus be employed to simultaneously drive any auxiliary unit or mechanism of the machine tool such as a hydraulic pump and/or a refrigerant pump, indicated by the numeral 60, connected to the output shaft 58.

In the embodiment shown in FIGS. 1 and 2 the first drive motor 36 is a variable speed, reversible electric motor capable of idling freely without imposition of any power source on it or capable of being either electrically or mechanically braked. The second motor 56 is in accordance with the embodiment a constant speed non-reversible motor. In the embodiment the second motor 56 comprises the prime drive motor means for the transmission 22 while the first motor 36 comprises the auxiliary motor means. Both motors are electrically driven and are conventional in form and are conventionally attached to an electric power source (not shown).

In operation, the primary drive motor 56 passes to the planetary transmission system 22 a basic input speed. However, so long as the first drive motor 36 is allowed to idle freely and is neither braked or operational, the input from the primary motor 56 is not transmitted by the transmission 22 to the output drive shaft 24 and the spindle 12 remains stationary. In this case, the planet gears 44 and 46 merely revolve freely about the sun gears 32 and 34 respectively even under the drive of the V-belt 52. On the other hand as soon as the auxiliary motor 36 is braked or placed under operational current from the power source, the primary drive motor 56 is caused to impose an ideal basic speed on the output of the planetary transmission system 22 capable of being used to drive the spindle 12. By braking the motor shaft 38 or the auxiliary motor 36, the planet gear 46 is caused to rotate about its own axis relative to its associated sun gear 34. This causes the second planet gear 44, jointly connected on the bearing journal axle 42, to also rotate transmitting its torque to the first sun gear 32 secured to the output shaft 24. Thus the output drive shaft 24 is caused to rotate. This same effect is obtained when the auxiliary motor 36 is impressed with current so that even though not braked it produces a relative rotation with respect to the primary motor 56. The rotation of the shaft 24 is transmitted via the V-belt to the spindle 12.

By braking or impressing a current upon the auxiliary motor 36 the action of the motor 36 is superimposed upon the speed of rotation of the primary drive motor 36. By rotating the auxiliary motor 36 in the same direction as the primary motor 36 an addition of rotating speeds is obtained. On the other hand by rotating the auxiliary motor 56 in a reverse direction to that of the primary motor 56, a substraction of the rotating speeds is obtained. Thus by adjusting and varying the speed and direction of rotation of the auxiliary motor 36 within its limits, which may be very wide depending upon the nature of the motor 36, a wide range of speeds can be impressed upon the spindle 12.

If the primary drive motor 56 were also capable of reversal this alone would permit the main spindle 12 to be capable of being driven at different speeds. In general, however, it is most advantageous to provide the auxiliary drive motor 36 with the variable speed and reverse direction characteristics. This provides sufficiently suitable speeds for obtaining such machining operations as turning, drilling and thread cutting. Simultaneously it allows the primary drive motor 56, which rotates at constant speed and uni-directionally to be connected to auxiliary pump and auxiliary mechanisms for operating the machine tool. Thhe auxiliary motor may be braked or varied in speed as required while the primary motor may be kept at its constant speed to run the auxiliary mechanisms.

While wide ranges of continuously variable speed ratios are possible, the present apparatus may be utilized at preselected speed ratios to obtain fixed relationships between the drive motor and the spindle. Such a system of operation is further illustrative of the present invention since it is indicative of what does actually occur during the operation. As a specific example therefor good speed ratios may be obtained by providing the first or auxiliary drive motor 36 to be driven at 1400 or 2800 r.p.m. and by providing the second or primary motor 56 to operate at 1420 r.p.m. If we consider the construction shown in FIGS. 1 and 2 operating under the situation thus provided, the several speed levels and the direction of rotation, as illustrated in FIG. 3 will become more apparent.

Turning to FIG. 3, the spindle remains stationary, illustrated as line $n_0$, even though the primary drive motor 56 is activated, so long as the auxiliary motor 36 is allowed to idle freely. As soon as the auxiliary motor 36 is switched on or its output shaft braked so as to be itself stationary, the transmission 22 is caused to pass to the spindle 12, via the output shaft 24 a speed produced by the primary motor 56 indicated as an ideal basic speed level $n_{id}$. By operating the auxiliary motor 36 at each of its selected speeds (1400 and 2800 r.p.m.) in each of its forward and reversed directions, two additional speed levels $n_1$, $n_2$ and $n_3$, $n_4$ are obtained above and below the ideal speed respectively. The resultant four speed levels above and below the ideal basic speed results from the fact that when the both drive motors are operated in the same direction the ideal basic speed initiated by the primary drive motor 56 is increased correspondingly by the selected speed of the auxiliary drive motor 36. Similary when the auxiliary drive motor 36 is driven in its reversed direction the ideal basic speed initiated by the drive motor 56 is correspondingly reduced by the selected speed of the auxiliary motor.

It will be seen from the diagram of FIG. 3 that when the auxiliary drive motor 36 is reversed at 2800 r.p.m., while the primary motor is driven at its constant forward speed of 1420 r.p.m., the output shaft 24, and spindle 12, is set in motion anti-clockwise at a relatively low speed indicated by the level $n_4$. When the auxiliary motor 36 is driven at its lower speed level (i.e. 1400 r.p.m.) the resultant direction of the spindle 12 is in the forward direction but also at a relatively low speed as indicated by the level $n_3$. The level $n_3$ may be used for instance for cutting normal righthand threads while the reverse direction and level $n_4$ may be used for instance to cut lefthand gear threads. In either case the slow speed at which the spindle 12 will operate is very suitable for thread cutting.

According to the initial level of the ideal basic speed $n_{id}$ the speed ratio between levels $n_1$ and $n_3$ or $n_2$ and $n_3$ can be adopted as desired. For any machine tool operation. The levels $n_1$ and $n_2$ are suitable for turning and drilling. For instance the speed of rotation $n_1:n_3$ can be reduced to a speed ratio of about 14:1 and the speed difference between $n_2:n_3$, to a speed ratio of about 10:1.

The adjustment of the ratios between the speed levels can be obtained of course by the construction of the epicyclic gear transmission 22. The adjustment of the ideal basic speed $n_{id}$ may be further obtained by varying the V-belt pulleys 50 and 54 between the primary motor 56 and the epicyclic gear transmission. Moreover, alteration and adjustment of the V-belt pulley system 26 about the pulleys 28 and 30 will further vary the output speed of the shaft 24 as pressed upon the spindle 12. Suitable electrical control means and switching devices for actuating the spindle brake 14 and simultaneously deactivating the auxiliary motor 36 is provided, although not shown in the drawings. Such simultaneous switching and control means is necessary as previously mentioned if the main spindle 12 is to be braked at any time. When this occurs it is necessary to place the auxiliary drive motor 36 in a free idle or free stop condition at once so that the power input from the primary drive motor 56 can be interrupted at the transmission 22.

Due to the fact that during the operation of the auxiliary driving motor 36, the outputs of both motors 36 and 56 on the input side of the planetary gear system 22 are added, the speed levels $n_1$ and $n_2$ can be made correspondingly high. In fact they can be made so high that the speed is suitable for chiping even though the auxiliary driving motor 36 is itself made relatively small. Because of this superimposition of the power output of both of the motors on each other, the mass of the auxiliary driving motor 36 can be maintained at a very low level. This in turn makes it possible to reduce the time period necessary for the switchover from one speed to another. During such switchover, the great mass of the transmission is in constant revolution due to the continuous drive of the primary motor 56 and that during switching only a fraction of the masses belonging to the primary drive motor has to be accelerated or braked. Thus loss of power during the switchover period is relatively slight.

The various changes and modifications and modes of operation as discussed earlier will be seen to be fully exemplified in the preferred embodiment as illustrated and described. In addition to these changes and modifications as are herein discussed, it will be apparent to those skilled in the art that other changes and modifications may be made. Accordingly, it is intended that the present description be illustrative only of the invention and not limiting of its scope.

I claim:

1. Apparatus for driving the spindle of a single-spindle lathe, comprising a drive shaft, means connecting said drive shaft to said spindle, a pair of drive motors for driving said drive shaft at selected rotational speeds, a planetary gear system operatively connecting said motors to said drive shaft and including said drive shaft as the output shaft thereof, the motor shaft of a first of said motors as the input shaft thereof, said output and input shafts being coaxially arranged, a first sun gear carried fixedly by said output shaft and a second sun gear carried fixedly by said input shaft, a bridge means rotatable about said input shaft having axle means associated therewith, said axle means mounting first and second planet gears engageable respectively with said first and second sun gears, and a second of said motors being operatively connected to said bridge means to rotate same, at least one of said motors having a variable speed, at least one of said motors being reversible.

2. The apparatus according to claim 1 wherein the drive motor which is variable in speed is also reversible in its direction of rotation.

3. The apparatus according to claim 1 wherein the motor arranged on the input shaft of said planetary gearing system is variable in speed and reversible in direction.

4. The apparatus according to calim 3 wherein said motor driving the bridge of the planetary gearing system rotates at constant speed.

5. The apparatus according to claim 4 wherein said constant speed motor simultaneously drives an auxiliary mechanism.

6. The apparatus according to claim 3 wherein said variable speed and reversible motor is provided with braking means.

7. The apparatus according to claim 1 wherein the means connecting the drive shaft and said spindle comprises a V-belt and stepped conical pulleys secured respectively on said drive shaft and said spindle.

8. The apparatus according to claim 7 wherein said conical pulleys are provided with a plurality of stepped diameters and are reciprocably arranged on their respective drive shafts and spindle.

9. The apparatus according to claim 3 including means for braking said spindle and means for simultaneously disconnecting said variable speed and variable motor to permit it to freely idle.

* * * * *